US008982250B2

(12) United States Patent
Asuka et al.

(10) Patent No.: US 8,982,250 B2
(45) Date of Patent: Mar. 17, 2015

(54) IMAGE PROCESSING APPARATUS

(71) Applicant: Hitachi, Ltd., Tokyo (JP)

(72) Inventors: Makoto Asuka, Tokyo (JP); Hiroyuki Miyahara, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 36 days.

(21) Appl. No.: 13/953,878

(22) Filed: Jul. 30, 2013

(65) Prior Publication Data
US 2014/0085505 A1 Mar. 27, 2014

(30) Foreign Application Priority Data

Sep. 26, 2012 (JP) ................................. 2012-211926

(51) Int. Cl.
*H04N 9/64* (2006.01)
*H04N 5/217* (2011.01)
(52) U.S. Cl.
CPC .................................. *H04N 5/2176* (2013.01)
USPC ....................................... 348/251; 348/229.1
(58) Field of Classification Search
None
See application file for complete search history.

(56) References Cited

U.S. PATENT DOCUMENTS

| 7,075,569 B2* | 7/2006 | Niikawa ..................... 348/218.1 |
| 2005/0206966 A1* | 9/2005 | Kakumitsu ..................... 358/461 |
| 2007/0285552 A1* | 12/2007 | Kim ............................... 348/335 |
| 2009/0190853 A1* | 7/2009 | Noh .............................. 382/264 |
| 2010/0309345 A1* | 12/2010 | Zimmer et al. ............... 348/242 |

FOREIGN PATENT DOCUMENTS

JP 2004-048562 A 2/2004

* cited by examiner

*Primary Examiner* — Twyler Haskins
*Assistant Examiner* — Wesley J Chiu
(74) *Attorney, Agent, or Firm* — Mattingly & Malur, PC

(57) ABSTRACT

An image processing apparatus is provided which minimizes reduction in S/N ratio and deterioration in resolution feeling at the lens periphery when the peripheral light amount drop correction of the lens is performed. An image processing LSI to perform the peripheral light amount drop correction of the imaging lens includes a space-direction noise removal correction part and a time-direction noise removal correction part. As the distance from the lens center position increases, the space-direction noise removal correction part reduces the noise reduction correction intensity to the image region to which the light amount drop correction gain is added in each image. As the distance from the lens center increases, the time-direction noise removal correction part increases the noise removal correction intensity to the image region to which the light amount drop correction gain is added in each image.

2 Claims, 8 Drawing Sheets

IMAGE PROCESSING APPARATUS

TECHNICAL FIELD

The present invention relates to an image processing apparatus including a device for correcting peripheral light amount drop caused by lens characteristics and an image processing method.

BACKGROUND ART

In general, the light gathering capability of a lens varies between the lens center and the lens periphery, and the lens has a characteristic that the light gathering capability decreases toward the lens periphery. By the influence of this characteristic, when objects having actually the same brightness are photographed, a phenomenon may occur in which a signal level difference occurs in images outputted through an image pickup apparatus. This phenomenon is called a peripheral light amount drop.

A recent image pickup apparatus normally includes a device for correcting the peripheral light amount drop. In such an image pickup apparatus, the peripheral light amount drop is generally corrected by amplifying an image signal, which is outputted through a lens and an image pickup sensor, according to the degree of the peripheral light amount drop.

In the image pickup apparatus as stated above, in a lens peripheral part where the peripheral light amount drop remarkably occurs, an amplification factor (hereinafter referred to as a light amount drop correction gain) required for correction becomes large. Since a random noise is generally included in the image signal, as the peripheral light amount drop correction gain becomes large, the noise is amplified, and the S/N (Signal/Noise) ratio of the image signal is reduced. Thus, although the general peripheral light amount drop correction technique can correct the peripheral light amount drop at the lens peripheral part, there is a problem that the S/N ratio at the lens peripheral part is liable to be reduced.

In order to solve this problem, Patent Literature 1 (JP-A-2004-48562) proposes an image pickup apparatus. The apparatus disclosed in Patent Literature 1 is a peripheral light amount drop correcting apparatus to reduce noise by continuously adjusting a noise reduction effect according to the peripheral light amount drop correction gain.

However, in the foregoing related art, although the peripheral light amount drop at the lens periphery is corrected, and the reduction of the S/N ratio at the lens periphery can be suppressed, deterioration in resolution feeling at the lens periphery is problematic.

In a lens, resolution capability varies between the lens center and the lens periphery, and the resolution capability decreases toward the periphery. Besides, in a noise removing technique using a spatial filter (noise removing unit in the space direction) as typified by a median filter used in the related art, the defect of the deterioration in resolution feeling can not be avoided although the degree of the defect varies according to the algorism excellence.

Thus, in the related art, first, the lens characteristic is such that the resolution feeling at the lens periphery is lower than that at the lens center, and further, the deterioration in resolution feeling as the side effect of the noise reduction process by the spatial filter is added. Accordingly, a difference in resolution feeling is liable to occur between the lens center and the lens periphery.

SUMMARY OF INVENTION

Therefore, the invention has an object to provide a unit configured to minimize reduction in S/N ratio and deterioration in resolution feeling at the lens periphery when the peripheral light amount drop correction of the lens is performed.

In order to solve the problem, the invention is configured as follows. That is, an image processing apparatus performs a peripheral light amount drop correction on an image signal, and then performs a space-direction noise removal. In the space-direction noise reduction at this time, the intensity of the noise removal is decreased toward a lens peripheral part. By doing so, deterioration in resolution feeling at the lens periphery is reduced. Then, the image processing apparatus performs time-direction noise removal on the image signal subjected to the space-direction noise removal. In the time-direction noise removal here, noise removal intensity is increased toward the lens peripheral part. Incidentally, the time-direction noise removal has a characteristic that the degree of the deterioration in resolution feeling at the lens peripheral part in the image signal is low as compared with the space-direction noise removal. Thus, the image processing apparatus reduces the deterioration in the resolution feeling at the lens peripheral part while reducing the reduction in the S/N ratio at the lens peripheral part in the image signal.

According to the invention, when the peripheral light amount drop correction of the lens is performed, the reduction in the S/N ratio at the lens periphery and the deterioration in the resolution feeling can be prevented. By this, a high quality image can be obtained.

DESCRIPTION OF EMBODIMENTS

Hereinafter, a mode for carrying out the invention (hereinafter called an embodiment) will be described.

Figure 1:
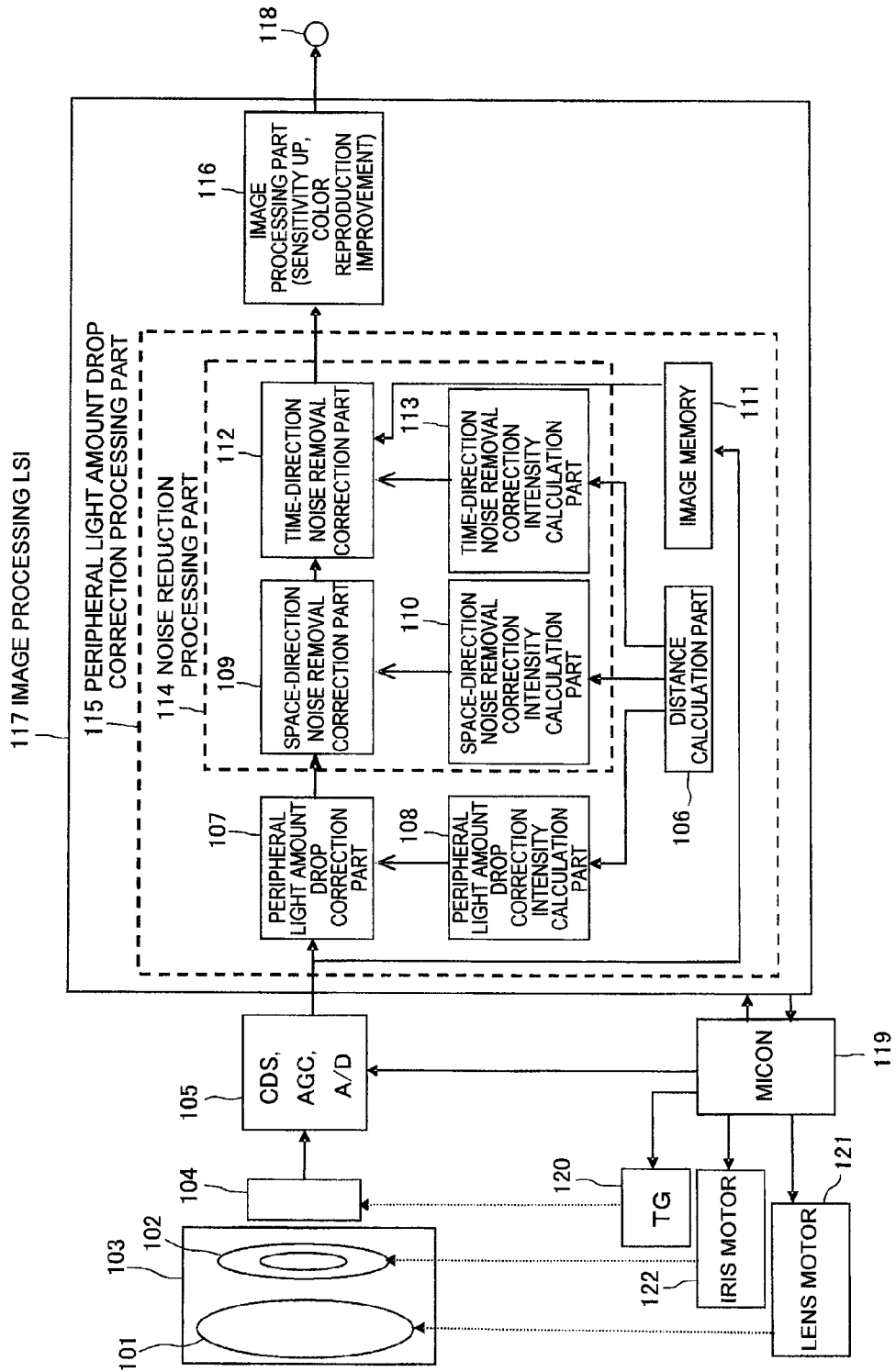
FIG. 1 is a system structural view of a camera including an image processing apparatus (image processing LSI (Large Scale Integration)) of an embodiment.

FIG. 1 is a system structural view of a camera including an image processing apparatus (an image processing LSI (Large Scale Integration)) 117 of the embodiment. A system structure, photographing by the camera and an operation at data recording will be described with reference to FIG. 1.

The system includes a lens unit 103, a CCD (Charge Coupled Device) sensor 104, an AFE (Analog Front End Circuit) circuit 105, a micon (microcomputer, control part)

119, a TG (Timing Generator) 120, a lens motor 121, an iris motor 122, the image processing LSI 117, and a camera image signal output part 118.

The lens unit 103 includes a lens 101 and an iris 102. The lens unit 103 has a zoom function, and the iris 102 adjusts the light amount of external light taken from the lens 101.

The CCD sensor 104 converts the light irradiated from the lens unit 103 into an image signal.

The AFE circuit 105 converts the inputted image signal into a signal capable of being processed by the image processing LSI 117. For example, the AFE circuit 105 performs a process, such as a correlated double sampling (hereinafter abbreviated to CDS) process, an analog AGC (Automatic Gain Control) process or an A/D (Analog/Digital) conversion process, on the inputted image signal. The AFE circuit 105 outputs the converted signal to the image processing LSI 117.

The micon 119 controls the TG 120 to generate a pulse required to drive the CCD sensor 104. Besides, the micon 119 drives the lens motor 121 and the iris motor 122, and controls to cause an arbitrary zoom position and an iris position to be selected. Further, the micon 119 controls the image processing LSI 117.

The TG 120 generates the pulse for driving the CCD sensor 104 based on the control from the micon 119.

The lens motor 121 controls the zoom position of the lens 101. The iris motor 122 controls the iris position of the iris 102. The camera image signal output part 118 outputs the signal outputted from the image processing LSI 117 to a display device (not shown) such as a monitor and displays an image on the display device.

The image processing LSI 117 includes a peripheral light amount drop correction part 115 that performs a peripheral light amount drop correction process and a noise reduction process on the inputted image signal, and an image processing part 116 that performs a process of causing the image of the image signal to be more clearly seen.

The peripheral light amount drop correction processing part 115 performs a lens peripheral light amount drop correction and a reduction process of noise emphasized by the peripheral light amount drop correction on the image signal inputted from the AFE circuit 105. The peripheral light amount drop correction processing part 115 outputs the image signal after the noise reduction process to the image processing part 116.

The image processing part 116 performs the process of causing the image of the image signal to be more clearly seen, such as a sensitivity UP process or a color reproducibility improving process, on the image signal inputted from the peripheral light amount drop correction processing part 115, and outputs the signal to the camera image signal output part 118.

Peripheral Light Amount Drop Correction Processing Part

Next, the peripheral light amount drop correction processing part 115 will be described in detail. The peripheral light amount drop correction processing part 115 includes a distance calculation part 106, a peripheral light amount drop correction part 107, a peripheral light amount drop correction intensity calculation part 108, an image memory 111 and a noise reduction processing part 114.

Process Flow of Peripheral Light Amount Drop Correction Processing Part

In the peripheral light amount drop correction processing part 115, the distance calculation part 106 first calculates the distance of each pixel from the lens center, and the peripheral light amount drop correction intensity calculation part 108 calculates the correction intensity of each pixel based on the calculated distance. Then, the peripheral light amount drop correction part 107 performs the peripheral light amount drop correction on each pixel based on the calculated correction intensity. Thereafter, the noise reduction processing part 114 performs the space-direction noise removal based on the distance of the pixel from the lens center calculated by the distance calculation part 106, and performs the time-direction noise removal correction on the image signal after the spatial-direction noise removal while referring to a previous image signal stored in the image memory 111. Then, the noise reduction processing part 114 outputs the image signal after the noise removal to the image processing part 116.

Figure 2:
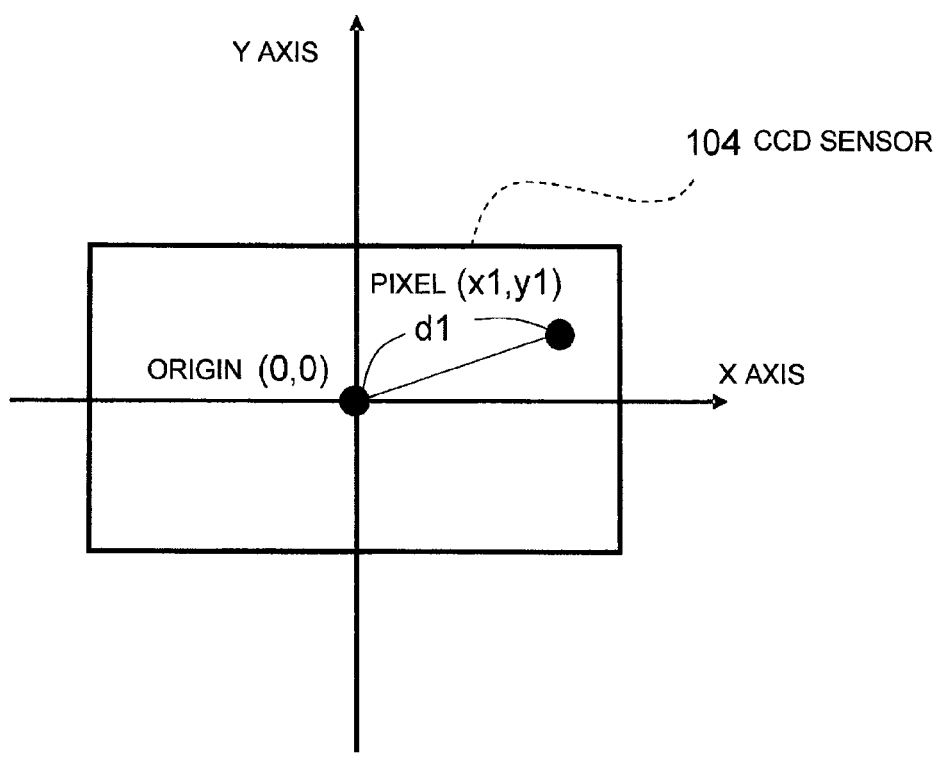
FIG. 2 is a view for explaining a distance d1 of each pixel from a lens center in the embodiment.

The center of the CCD sensor 104, which is the center of the lens 101, is made the origin (0,0) and the distance calculation part 106 calculates a distance d1 between the origin and an arbitrary pixel coordinate (x1,y1) on the CCD sensor 104. For example, as shown in FIG. 2, the center of the CCD sensor 104, which is the center of the lens 101, is made the origin (0,0) and the distance calculation part 106 calculates the distance d1 between the origin and the arbitrary pixel coordinate (x1,y1) on the CCD sensor 104 by the following expression (1).

[Numerical Expression 1]

$$d1 = \sqrt{(x1)^2 + (y2)^2} \qquad \text{expression (1)}$$

The peripheral light amount drop correction part 107 performs the correction by adding a digital gain as a peripheral light amount drop correction gain against the reduction of the image signal level. The value calculated by the peripheral light amount drop correction intensity calculation part 108 is used as the value of the digital gain to be added. The functions of the peripheral light amount drop correction intensity calculation part 108 and the peripheral light amount drop correction part 107 are realized by, for example, the technique disclosed in Patent Literature 1.

Figure 3:
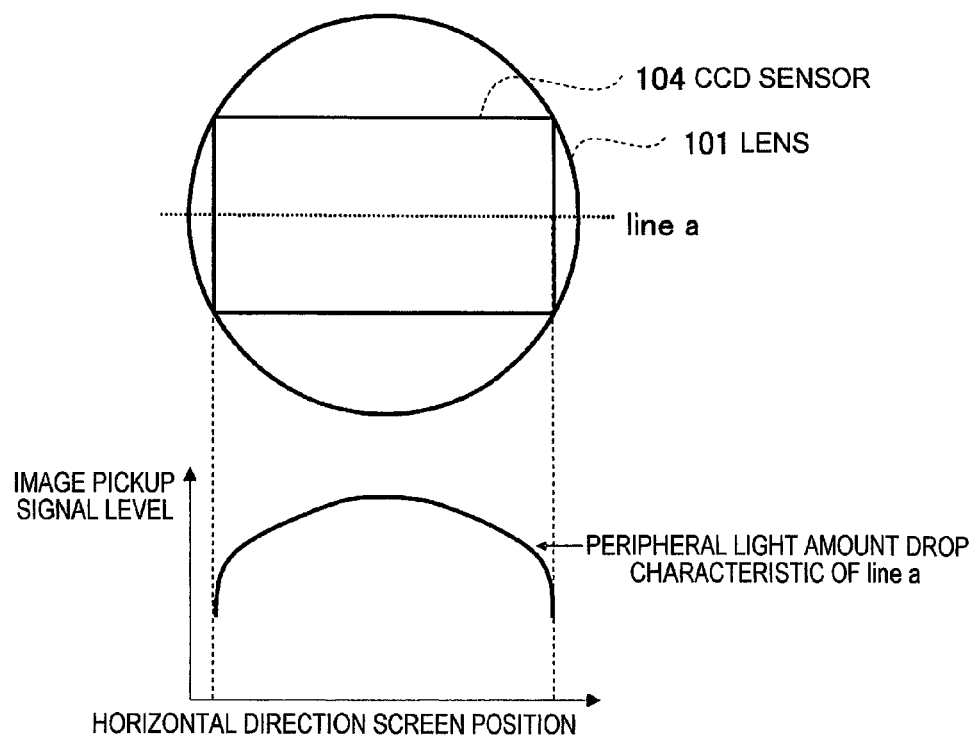
FIG. 3 is a view for explaining reduction in image signal level by reduction in light gathering capability at the lens periphery.

Here, a reduction in image signal level by a reduction in light gathering capability at the lens periphery will be described with reference to FIG. 3. FIG. 3 shows the lens 101 of FIG. 1, a plane of the CCD sensor 104 to which an image is irradiated through the lens 101, and a change in the image signal level when the plane is seen along a line a. With respect to the image signal level on the line a of FIG. 3, the light gathering capability of the lens 101 is reduced toward the periphery of the lens 101. Thus, the image signal level at the lens periphery is lower than the image signal level at the center of the lens 101. Thus, the peripheral light amount drop correction part 107 adds a larger digital gain to the lens peripheral part in order to increase the image signal level at the lens periphery.

The peripheral light amount drop correction intensity calculation part 108 of FIG. 1 calculates the digital gain, which is added to the image signal by the peripheral light amount drop correction part 107, based on the distance d1 calculated by the distance calculation part 106. The calculation method of the digital gain will be described later.

The image memory 111 stores image signals previous to the present image signal. The image signals on the image memory 111 are used when a time-direction noise removal correction part 112 of the noise reduction processing part 114 corrects a time-direction noise.

The noise reduction processing part 114 performs the noise reduction process of the image signal inputted from the peripheral light amount drop correction part 107. Although the details of the noise reduction process will be described later, the noise reduction processing part 114 combines the space-direction noise removal and the time-direction noise removal, so that the noise reduction is realized while preventing the reduction in resolution feeling to the utmost.

Peripheral Light Amount Drop Correction

Here, calculation of the digital gain by the peripheral light amount drop correction intensity calculation part 108 will be described. When a signal level of an arbitrary pixel on the CCD sensor 104 is e, the peripheral light amount drop correction intensity calculation part 108 uses the following expression (2) to calculate a signal level e' obtained when a digital gain X is added.

$$e' = e \times 10^{(\text{digital gain } X/20)} (\text{digital gain } X[\text{dB}],$$
$$X = A, B, C, \ldots)  \quad \text{expression (2)}$$

Figure 4:
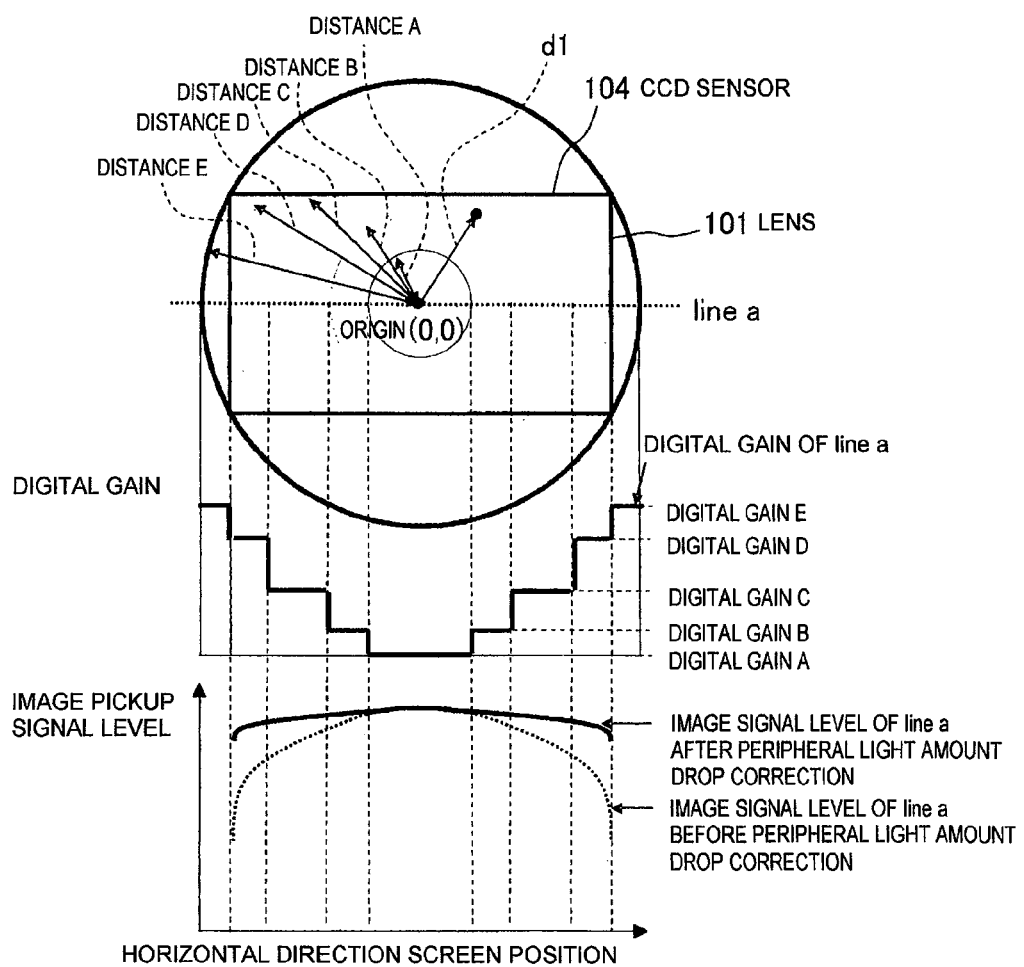
FIG. 4 is a view for explaining a calculation method of digital gain X according to the distance d1 of each pixel from the lens center in the embodiment.

The peripheral light amount drop correction intensity calculation part 108 calculates the digital gain X to be added to each pixel according to the distance d1 of each pixel from the lens center. FIG. 4 shows the calculation method of the digital gain X according to the distance d1. In FIG. 4, the lens center is made the origin (0,0), the distance from the origin is divided into five stages of distance A, distance B, distance C, distance D and distance E in the order of from the shortest distance, and the distances are used to calculate the digital gain X in the following five stages of (1) to (5).

(1) If origin≤distance d1<distance A, then digital gain X=digital gain A.

(2) If distance A≤distance d1<distance B, then digital gain X=digital gain B.

(3) If distance B≤distance d1<distance C, then digital gain X=digital gain C.

(4) If distance C≤distance d1<distance D, then digital gain X=digital gain D.

(5) If distance D≤distance d1<distance E, then digital gain X=digital gain E.

The peripheral light amount drop correction processing part 115 of FIG. 1 adds the digital gain X calculated by the peripheral light amount drop correction intensity calculation part 108 in (1) to (5) to the signal level e of the arbitrary pixel of the image signal.

As shown in FIG. 4, the magnitude of the digital gain X is made digital gain A≤digital gain B≤digital gain C≤digital gain D≤digital E. As the distance d1 becomes larger toward the lens periphery, the digital gain X is increased. However, the digital gain A of FIG. 4 is the gain in the vicinity of the lens center, and the peripheral light amount drop generally hardly occurs, and accordingly, the digital gain A is 0.

When the peripheral light amount drop correction part 107 adds the digital gain X to the image signal level on the line a of FIG. 4, the correction level is increased toward the lens periphery, such as from the digital gain A to the digital gain E, so that the peripheral light amount drop becomes unnoticeable.

As stated above, the peripheral light amount drop correction part 107 of FIG. 1 corrects the reduction in the lens peripheral level of the image signal by the lens peripheral light amount drop. Here, since the peripheral light amount drop correction part 107 adds the digital gain X, the noise component is also amplified toward the lens periphery. Then, the noise reduction processing part 114 of the image processing LSI 117 improves the S/N ratio in view of the deterioration in the resolution feeling.

Noise Reduction Processing Part

The noise reduction processing part 114 will be described in detail. The noise reduction processing part 114 includes a space-direction noise removal correction part 109, a space-direction noise removal correction intensity calculation part 110, the time-direction noise removal correction part 112, and a time-direction noise removal correction intensity calculation part 113. Incidentally, the space-direction noise removal correction part 109 and the space-direction noise removal correction intensity calculation part 110 correspond to a noise removal part using a spatial filter. The time-direction noise removal correction part 112 and the time-direction noise removal correction intensity calculation part 113 correspond to a noise removal part using a time filter.

Process Flow of the Noise Reduction Processing Part

In the noise reduction processing part 114, first, the space-direction noise removal correction intensity calculation part 110 calculates the space-direction noise removal correction intensity on each pixel according to the distance of each pixel from the lens center calculated by the distance calculation part 106. Then, the space-direction noise removal correction part 109 performs the space-direction noise removal on each pixel based on the calculated noise removal correction intensity. Thereafter, the image signal after the space-direction noise removal is outputted to the time-direction noise removal correction part 112. The time-direction noise removal correction intensity calculation part 113 calculates the time-direction noise removal correction intensity on each pixel according to the distance of each pixel from the lens center calculated by the distance calculation part 106. Then, the time-direction noise removal correction part 112 reads the previous image of the image signal from the image memory 111, and performs the time-direction noise removal correction on each pixel of the present image of the image signal while referring to the previous image. The time-direction noise removal correction part 112 outputs the image signal after the time-direction noise removal correction to the image processing part 116.

Space-Direction Noise Removal Correction

First, the space-direction noise removal correction will be described. The space-direction noise removal correction part 109 performs the space-direction noise removal on the image signal outputted from the peripheral light amount drop correction part 107 according to the distance d1 and improves the S/N ratio. Hereinafter, the space-direction noise removal will be described in detail.

Figure 5:
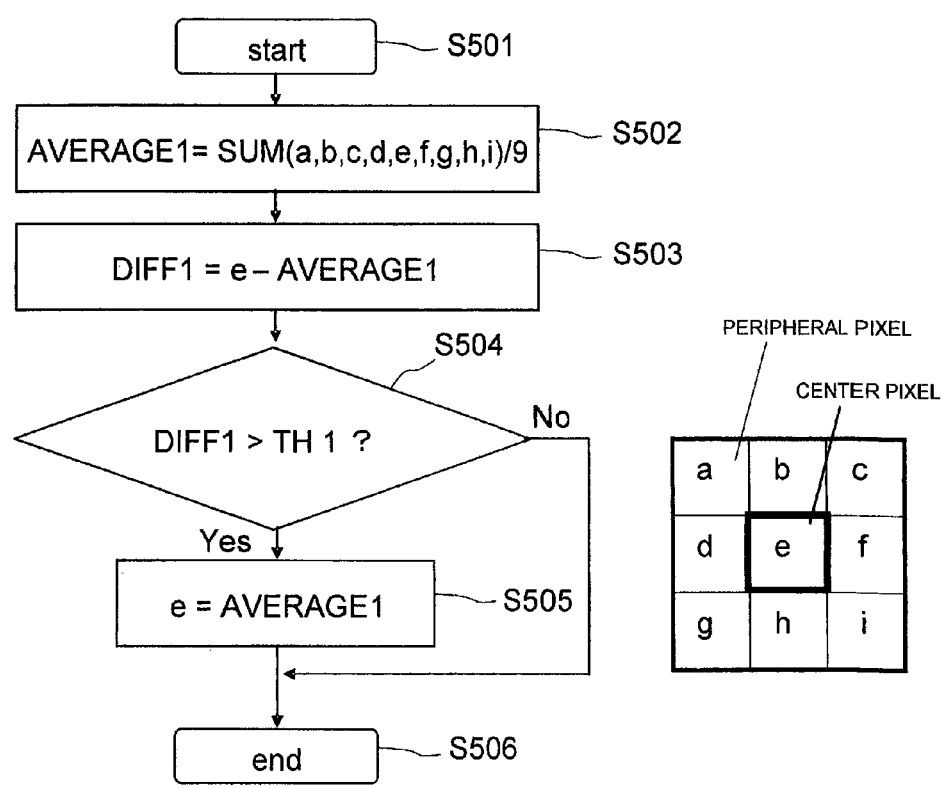
FIG. 5 is a view showing a procedure of space-direction noise removal correction in a space-direction noise removal correction part of FIG. 1.

FIG. 5 shows the procedure of the space-direction noise removal correction by the space-direction noise removal correction part 109. In FIG. 5, a signal level of a presently processed arbitrary pixel is e, and signal levels of peripheral pixels when this pixel is the center are a, b, c, d, f, g, h and i.

The space-direction noise removal correction part 109 starts the process at S501 of FIG. 5. First, with respect to the signal level e of the lens center pixel (center pixel), the space-direction noise removal correction part 109 adds the signal level of the center pixel to those of the lens peripheral pixels (peripheral pixels) (SUM (a, b, c, d, e, f, g, h, i) and divides (/9). By this, the space-direction noise removal correction part 109 calculates an average value AVERAGE1 of the signal levels of the nine pixels in the lens center (S502).

At S503, the space-direction noise removal correction part 109 calculates a difference DIFF1 between the signal level e of the center pixel and the average value AVERAGE1 calculated at S502.

At S504, the space-direction noise removal correction part 109 determines whether the difference DIFF1 calculated at S503 is larger than a threshold TH1. If the difference DIFF1 is larger than the threshold TH1 (Yes at S504), the space-direction noise removal correction part 109 determines that the signal level e of the center pixel is noise, and replaces, at S505, the signal level e of the center pixel by the average value AVERAGE1 calculated at S502, and ends the process (S506). On the other hand, if the difference DIFF1 is not larger than the threshold TH1 (No at S504), the space-direction noise removal correction part 109 does not perform the process of S505 but ends the process (S506). The space-direction noise removal correction part 109 performs such a process on each pixel of the image of the image signal.

By this, the space-direction noise removal correction part 109 smooths the noise of the image signal. At this time, the threshold TH1 referred to at S504 is the value calculated by the space-direction noise removal correction intensity calculation part 110 which uses the distance d1 calculated by the distance calculation part 106.

Figure 6:
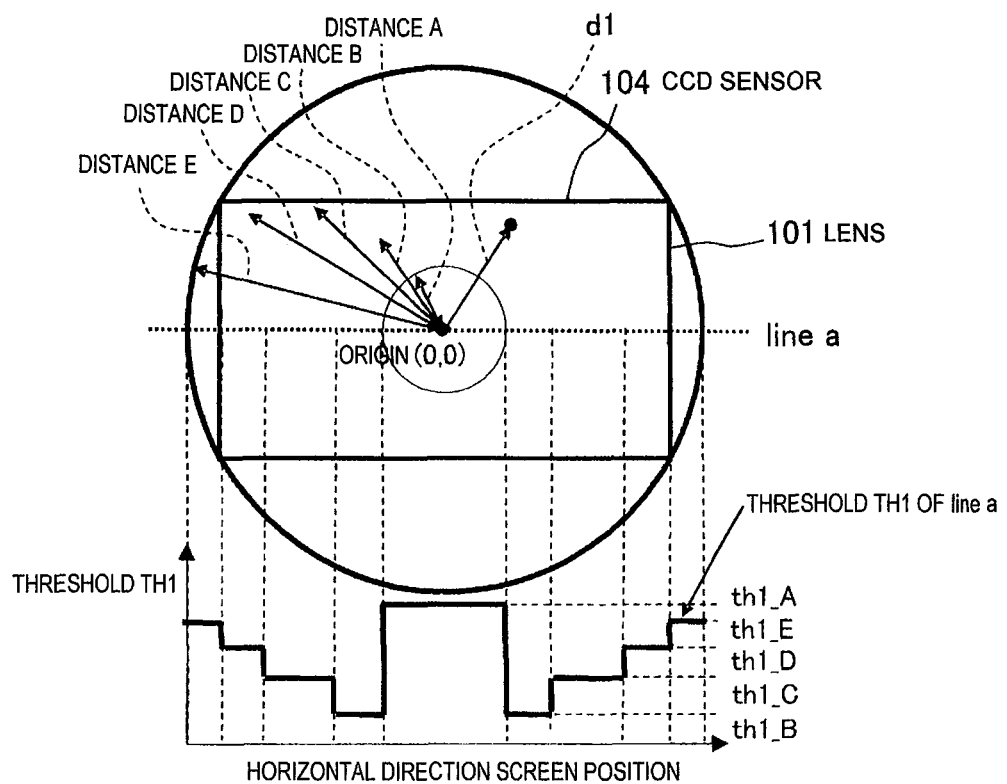
FIG. 6 is a view for explaining a calculation method of a threshold TH1 according to the distance d1 of each pixel from the lens center in the embodiment.

FIG. 6 shows a calculation method of the threshold TH1 corresponding to the distance d1. Similarly to FIG. 4, the lens center is the origin (0,0), and the distance from the origin is divided into five stages of distance A, distance B, distance C, distance D and distance E. The threshold TH1 for determining whether the spatial-direction noise removal correction is performed on each pixel is set by using these distances as described in (1) to (5).

(1) If origin≤distance d1<distance A, then threshold TH1=th1_A (2) If distance A≤distance d1<distance B, then threshold TH1=th1_B (3) If distance B≤distance d1<distance C, then threshold TH1=th1_C (4) If distance C≤distance d1<distance D, then threshold TH1=th1_d.

(5) If distance D≤distance d1<distance E, then threshold TH=th1_E.

Here, the magnitude of the threshold is made th1_B≤th1_C≤th1_D≤th1_E≤th1_A. As the distance d1 increases toward the lens periphery, the magnitude of the threshold TH1 is increased. That is, the effect of the spatial-direction noise removal correction is reduced toward the lens periphery. However, the range of origin≤distance d1<distance A is near the center of the lens, and the peripheral light amount drop correction processing part 115 does not add the digital gain in the peripheral light amount drop correction. Thus, the space-direction noise removal correction intensity calculation part 110 makes th1_A the largest value. That is, the space-direction noise removal correction intensity calculation part 110 regards the spatial-direction noise removal correction of the lens center part as substantially unnecessary, and turns off the spatial-direction noise removal correction.

In the related art, the spatial-direction noise removal correction is generally increased toward the lens periphery. However, the image processing LSI 117 of the embodiment reduces the spatial-direction noise removal correction toward the lens periphery. By this, the deterioration in the resolution feeling, which is the defect of the spatial-direction noise removal correction, can be reduced at the lens periphery.

Time-Direction Noise Removal Correction

Next, the time-direction noise removal correction will be described. The time-direction noise removal correction part 112 performs the time-direction noise removal correction on the image signal outputted from the space-direction noise removal correction part 109 according to the distance d1, and improves the S/N ratio.

Figure 7:
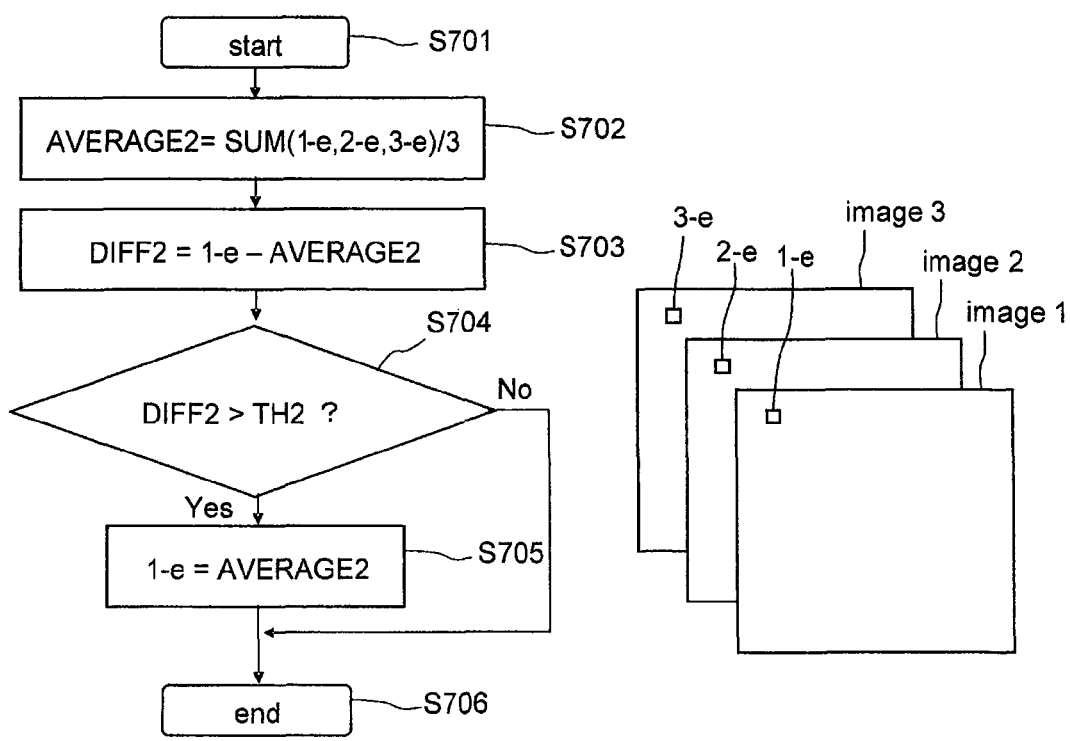
FIG. 7 is a view showing a procedure of time-direction noise removal correction in a time-direction noise removal correction part of FIG. 1.

FIG. 7 shows a procedure of the time-direction noise removal correction by the time-direction noise removal correction part 112. The image memory 111 (see FIG. 1) stores images image2, image3, ... previous to the present image image1. In FIG. 7, although the two images image2 and image3 previous to the present image image1 are stored, the number of the stored images is arbitrary.

In FIG. 7, a signal level of an arbitrary pixel of the image image1 presently processed by the time-direction noise removal correction part 112 of FIG. 1 is 1-e, and signal levels of the same arbitrary pixels of the two previous images image2 and image3 as that of the image image1 are 2-e and 3-e.

The time-direction noise removal correction part 112 starts the process at S701 of FIG. 7. First, the time-direction noise removal correction part 112 calculates an average value AVERAGE2 of a signal level e of an arbitrary pixel in the time axis direction by adding the signal level 1-e of the arbitrary pixel of the present image image1 to the signal levels 2-e and 3-e of the arbitrary pixels of the previous images image2 and image3 (SUM(1-e, 2-e, 3-e)) and by dividing (/3) at S702.

At S703, the time-direction noise removal correction part 112 calculates a difference DIFF2 between the signal level 1-e of the arbitrary pixel of the present image image1 and the average value AVERAGE2 calculated at S702.

At S704, the time-direction noise removal correction part 112 determines whether the difference DIFF2 calculated at S703 is larger than a threshold TH2. If larger (Yes at S704), the time-direction noise removal correction part 112 determines that the signal level 1-e of the arbitrary pixel of the present image image1 is noise, smooths the noise by, at S705, replacing the signal level 1-e of the arbitrary pixel of the present image image1 by the average value AVERAGE2 calculated at S702, and ends the process (S706). On the other hand, if the difference DIFF2 is not larger than the threshold TH2 (No at S704), the time-direction noise removal correction part 112 does not perform the process of S705 but ends the process (S706). The time-direction noise removal correction part 112 performs such a process on each pixel of the image of the image signal.

By this, the time-direction noise removal correction part 112 smooths the noise of the image signal. At this time, the threshold TH2 referred to at S704 is calculated by the time-direction noise removal correction intensity calculation part 113 by using the distance d1 calculated by the distance calculation part 106.

Figure 8:
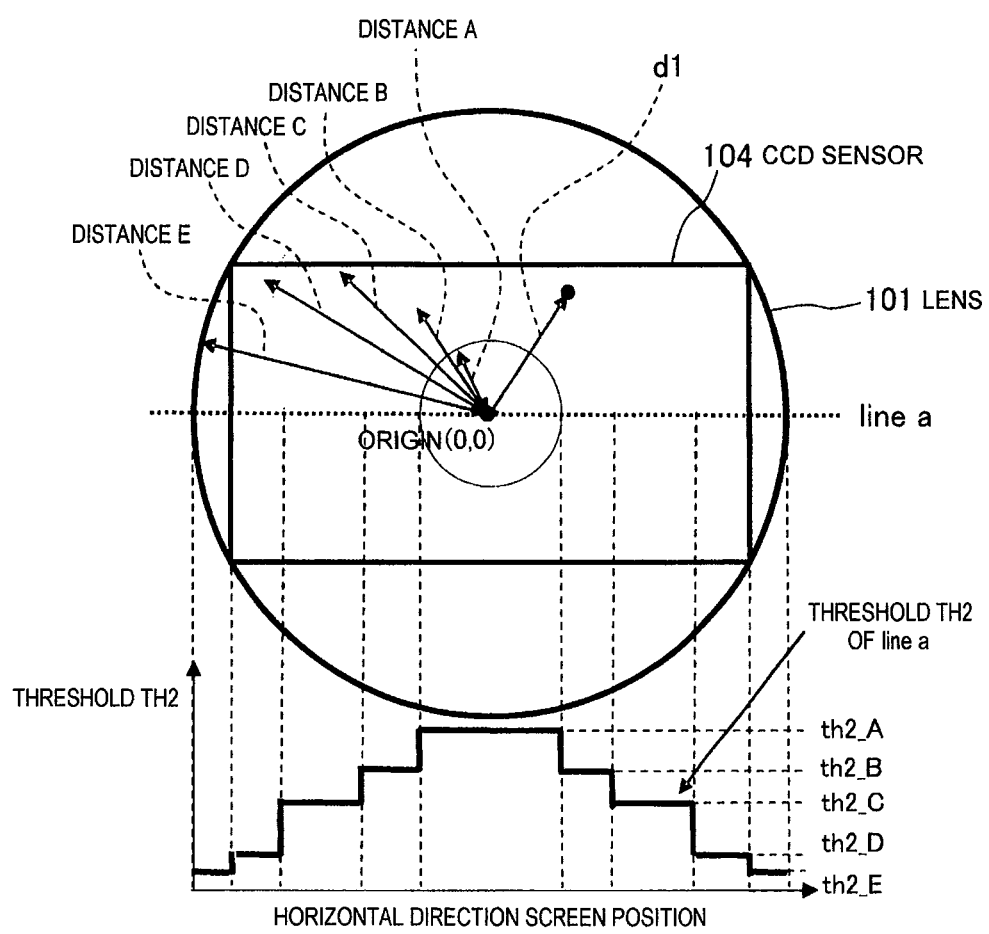
FIG. 8 is a view for explaining a calculation method of a threshold TH2 according to the distance d1 of each pixel from the lens center in the embodiment.

FIG. 8 shows a calculation method of the threshold TH2 according to the distance d1. Similarly to FIG. 4, the lens center is the origin (0,0), and the distance from the origin is divided into five stages of distance A, distance B, distance C, distance D and distance E. The threshold TH2 for determining whether the time-direction noise removal correction is performed on each pixel is set by using these distances as described in (1) to (5).

(1) If origin≤distance d1<distance A, then threshold TH2=th2_A.

(2) If distance A≤distance d1<distance B, then threshold TH2=th2_B.

(3) If distance B≤distance d1<distance C, then threshold TH2=th2_C.

(4) If distance C≤distance d1<distance D, then threshold TH2=th2_D.

(5) If distance D≤distance d1<distance E, then threshold TH2=th2_E.

Here, the magnitude of the threshold TH2 is made th2_E≤th2_D≤th2_C≤th2_B≤th2_A. As the distance d1 increases toward the lens periphery, the value of the threshold TH2 is reduced. That is, the effect of the time-direction noise removal correction is increased toward the lens periphery. However, similarly to the case of the spatial noise removal correction, the region of origin≤distance d1<distance A is near the center of the lens, and the peripheral light amount drop correction processing part 115 does not add the digital gain in the peripheral light amount drop correction. Thus, the time-direction noise removal correction intensity calculation part 113 makes th2_A the largest value. That is, the time-direction noise removal correction intensity calculation part 113 regards the time-direction noise removal correction of the lens center as substantially unnecessary, and turns off the time-direction noise removal correction.

As compared with the space-direction noise removal correction, the time-direction noise removal correction can improve the S/N ratio without reducing the resolution feeling, and is suitable for the improvement of the S/N ratio in the vicinity of the lens periphery. Besides, the time-direction noise removal correction part 112 of this embodiment increases the effect of the time-direction noise removal correction toward the lens periphery, and reduces it toward the lens center. Further, the time-direction noise removal correction part 112 does not substantially perform the time-direction noise removal correction of the lens center (for example, region of the distance A of FIG. 8). Thus, afterimage feeling on the screen, which may occur when the time-direction noise removal correction is performed, can be limited to the vicinity of the lens periphery. Besides, according to human eye characteristics, the afterimage feeling at the periphery of a screen does not cause annoying as compared with the center of the screen. Thus, according to the time-direction noise removal correction part 112 of this embodiment, the afterimage feeling on the screen is further reduced.

From the above, according to the system of this embodiment, after the peripheral light amount drop is corrected, the noise reduction can be realized while the deterioration in resolution feeling at the lens periphery, which is the problem when the noise reduction process is performed, is suppressed to the utmost.

Incidentally, in the embodiment, although the distance calculation part 106 uses the distance d1 in expression (1), since the relative value of the distance to each pixel has only to be known, $d1^2$ may be used.

Besides, the correction gain added by the peripheral light amount drop correction part 107 may be any gain other than the digital gain as long as the gain can be added to the image signal.

Further, in the embodiment, although the distance from the lens center is divided into the five stage of distance A to distance E, the distance may be divided into any number of stages, and accordingly, the digital gain X added by the peripheral light amount drop correction part 107 can also be set finely. In this case, the threshold TH1 used in the spatial noise removal correction and the threshold TH2 used in the time noise removal correction can also be set finely according to the distance range.

Incidentally, although the CCD sensor 104 is used as the image pickup device in FIG. 1, an image pickup device other than the CCD sensor, such as a CMOS (Complementary Metal Oxide Semiconductor), may be used.

The functions of the image processing LSI 117 of the embodiment may be realized by hardware to perform the foregoing process or may be realized by the program execution process by the CPU (Central Processing Unit).

What is claimed is:

1. An image processing apparatus comprising:
a peripheral light amount drop correction part that receives input of an image signal, and adds a peripheral light amount drop correction gain of a peripheral part of an imaging lens to each image constituting the inputted image signal according to a peripheral light amount drop characteristic of the imaging lens;
a first noise removal part using a spatial filter to perform a first noise removal correction to change a first noise removal correction intensity of each image constituting the image signal according to a distance of each pixel from the lens center position of the imaging lens;
an image memory to store each image constituting the image signal; and
a second noise removal part using a time filter to perform a second noise removal correction to change a second noise removal correction intensity of a present image constituting the inputted image signal according to the distance of each pixel from the lens center position and by referring to an image previous to the present image and stored in the image memory, wherein
as the distance of each pixel from the lens center position increases, the first noise removal part using the spatial filter reduces the first noise removal correction intensity using the spatial filter to an image region to which the peripheral light amount drop correction gain is added in each image, and
as the distance of each pixel from the lens center position increases, the second noise removal part using the time filter increases the second noise removal correction intensity using the time filter to the image region to which the peripheral light amount drop correction gain is added in each image.

2. The image processing apparatus according to claim 1, wherein
the first noise removal part using the spatial filter does not perform the first noise removal correction using the spatial filter to an image region to which the peripheral light amount drop correction gain is not added in each image, and
the second noise removal part using the time filter does not perform the second noise removal correction using the time filter to the image region to which the peripheral light amount drop correction gain is not added in each image.

* * * * *